US012803880B2

(12) United States Patent
Hong et al.

(10) Patent No.: US 12,803,880 B2
(45) Date of Patent: Nov. 17, 2026

(54) METHOD AND APPARATUS FOR GRAPH NEURAL NETWORK BASED VIRTUAL NETWORK MANAGEMENT

(71) Applicant: POSTECH Research and Business Development Foundation, Pohang-si (KR)

(72) Inventors: Won Ki Hong, Pohang-si (KR); Jae Hyoung Yoo, Seoul (KR); Hee Gon Kim, Daegu (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 1172 days.

(21) Appl. No.: 17/685,301

(22) Filed: Mar. 2, 2022

(65) Prior Publication Data

US 2022/0286366 A1 Sep. 8, 2022

(30) Foreign Application Priority Data

Mar. 2, 2021 (KR) ........................ 10-2021-0027452
Feb. 28, 2022 (KR) ........................ 10-2022-0026209

(51) Int. Cl.
*H04L 41/16* (2022.01)
*G06N 3/045* (2023.01)
*H04L 41/40* (2022.01)

(52) U.S. Cl.
CPC ............. *H04L 41/16* (2013.01); *G06N 3/045* (2023.01); *H04L 41/40* (2022.05)

(58) Field of Classification Search
CPC .......... H04L 41/16; H04L 41/40; G06N 3/045
See application file for complete search history.

(56) References Cited

U.S. PATENT DOCUMENTS

| | | | | |
|---|---|---|---|---|
| 6,807,575 | B1 * | 10/2004 | Emaru | H04L 43/00 719/317 |
| 12,067,462 | B2 * | 8/2024 | Dodds | G06F 11/3698 |
| 2021/0297324 | A1 * | 9/2021 | Singh | G06N 3/0499 |
| 2022/0164585 | A1 * | 5/2022 | Ayvaci | B60W 60/001 |

OTHER PUBLICATIONS

R. Mijumbi et al., "Topology-Aware Prediction of Virtual Network Function Resource Requirements," in IEEE Transactions on Network and Service Management, vol. 14, No. 1, pp. 106-120, Mar. 2017, doi: 10.1109/TNSM.2017.2666781. (Year: 2017).*

(Continued)

*Primary Examiner* — Jennifer N Welch
*Assistant Examiner* — Jake Timothy Breen
(74) *Attorney, Agent, or Firm* — Morgan, Lewis & Bockius LLP

(57) ABSTRACT

A method for graph neural network-based virtual network management may comprise: preprocessing collected network data; converting node and edge data among the data for each category generated in the preprocessing step into a graph; learning the network data expressed in a matrix generated in the step of converting into the graph using a graph neural network (GNN); and learning node state information for each node generated through the learning using the GNN using a feedforward neural network (FNN) together with service list data.

20 Claims, 10 Drawing Sheets

(56) References Cited

OTHER PUBLICATIONS

K. R. M. Fernando et al., "Dynamically Weighted Balanced Loss: Class Imbalanced Learning and Confidence Calibration of Deep Neural Networks," in IEEE Xplore, Jan. 2021, doi: 10.1109/TNNLS.2020.3047335. (Year: 2021).*

B. Addis et al., "Virtual network functions placement and routing optimization," 2015 IEEE 4th International Conference on Cloud Networking (CloudNet), Niagara Falls, ON, Canada, 2015, pp. 171-177, doi: 10.1109/CloudNet.2015.7335301. (Year: 2015).*

Y. Xiao et al. "NFVdeep: Adaptive online service function chain deployment with deep reinforcement learning." Proceedings of the international symposium on quality of service. 2019. (Year: 2019).*

Z. Wu et al., "A Comprehensive Survey on Graph Neural Networks," in IEEE Transactions on Neural Networks and Learning Systems, vol. 32, No. 1, pp. 4-24, Jan. 2021, doi: 10.1109/TNNLS.2020.2978386. (Year: 2021).*

S. Yang et al., "Delay-Aware Virtual Network Function Placement and Routing in Edge Clouds," in IEEE Transactions on Mobile Computing, vol. 20, No. 2, pp. 445-459, Feb. 1, 2021, doi: 10.1109/TMC2019.2942306. (Year: 2021).*

R. Gouareb et al., "Delay Sensitive Virtual Network Function Placement and Routing," 2018 25th International Conference on Telecommunications (ICT), Saint-Malo, France, 2018, pp. 394-398, doi: 10.1109/ICT.2018.8464883. (Year: 2018).*

F. Wang et al., "Bandwidth guaranteed virtual network function placement and scaling in datacenter networks," 2015 IEEE 34th International Performance Computing and Communications Conference (IPCCC), Nanjing, China, 2015, pp. 1-8, doi: 10.1109/PCCC2015.7410276. (Year: 2015).*

Sun et al., "Combining Deep Reinforcement Learning With Graph Neural Networks for Optimal VNF Placement", IEEE Comunnications Letters, vol. 25, No. 1, Jan. 2021, pp. 176-180.

* cited by examiner

FIG. 6C

Servers

| | | | | | |
|---|---|---|---|---|---|
| 1 | −1 | 0 | 0 | 1 | 0 |
| 2 | 0 | 0 | 0 | 0 | 1 |
| 3 | −1 | 0 | 1 | 0 | 1 |
| · · · | −1 | −1 | 0 | 0 | 0 |
| 12 | 1 | 0 | 0 | 0 | −1 |
| | F | P | I | N | W |

VNF types

METHOD AND APPARATUS FOR GRAPH NEURAL NETWORK BASED VIRTUAL NETWORK MANAGEMENT

CROSS-REFERENCE TO RELATED APPLICATIONS

This application claims priority to Korean Patent Applications No. 10-2021-0027452 filed on Mar. 2, 2021, and No. 10-2022-0026209 filed on Feb. 28, 2022 with the Korean Intellectual Property Office (KIPO), the entire contents of which are hereby incorporated by reference.

BACKGROUND

1. Technical Field

The present disclosure relates to a virtual network management technology, and more particularly, to a method and apparatus for virtual network management based on a graph neural network.

2. Related Art

A network function virtualization (NFV) technology refers to a technology that enables a plurality of users to independently use a virtual network by creating a virtual network on a publicly used physical network infrastructure. With the advent of cloud computing and future Internet technologies, this technology is evolving in various forms, such as virtualizing all resources and separating infrastructure and service providers.

In addition, many studies are being conducted to realize a network virtualization technology by utilizing a Software Defined Networking (SDN) paradigm. Software defined networking is advanced from the existing hardware-based networking method and enables administrators to program the network itself, and based on this, provides the advantages such as agility, elasticity, and flexibility in a dynamic network environment.

SDN and NFV allow administrators to centrally and dynamically manage the network, making network management more efficient. SDN controllers and NFV managers provide global views of networks and NFV environments, which operators can use to manage network and service orchestration. Additionally, virtual network functions (VNFs) can be extended and optimized to prevent over-provisioning of resources and provide high availability. However, although SDN/NFV enables efficient network management, it does not provide an optimal management solution for virtual network management.

Integer linear programming (ILP) is one of the optimization methods for network management. ILP aims to minimize the linear cost function and uses a set of linear equality and inequality constraints to obtain an optimal solution. However, the ILP-based network management method is not suitable for real-time network management because it takes a relatively long time to find an optimal solution.

Currently, network management completely relies on human judgment, and thus requires operational management personnel with specialized knowledge. However, securing such an operating manpower is costly, and the more complex the network, the more difficult it is to manage. In particular, although a linear expression that optimizes the network using various conditions of the network is derived in an integer liner programming (ILP), there is a problem that it takes too much time to derive the linear expression. In order to solve this problem, recent attempts have been made to optimize the network in a short time by applying machine learning technology to network management.

Recently, machine learning (ML) is emerging as a new paradigm to solve various networking problems and automate network management. ML provides models that automatically learn and improve from experience without any explicit programming. In other words, ML refers to a method in which computer software learns itself to solve problems without human help, and there are largely supervised learning, unsupervised learning, and reinforcement learning methods. These MLs take time to learn, but little time after training. ML is also more effective at learning broad and dynamically changing data than in statistical methods. However, despite the aforementioned advantages of ML, it is not easy to apply ML to network management.

In the field of ML technology, deep learning technology, a method similar to human thinking, is applied as abstraction through various non-linear transformation methods, and is applied to supervised learning, unsupervised learning, and reinforcement learning, resulting in high performance improvement. This is because many existing problems have been solved with the improvement of computing performance, big data, and the development of new algorithms. In order to use such ML for network management, a specialized machine learning model is required to learn sufficient network data and networks well.

However, since there are currently only tens of data available for network management, it is difficult to use sufficient data suitable for learning in most of the existing network management technologies applying ML. In addition, since most of the existing technologies use a generalized ML model rather than a specialized ML model for network management and use simple numerical data for learning, it is difficult to properly reflect the structure or topology of the network to be managed. As such, the existing network management technology using ML is limited to solving simple problems in network management and compared to other ML research fields, it does not sufficiently show the advantages of ML.

SUMMARY

The present disclosure has been derived to solve the problems of the conventional technology, and an object of the present disclosure is to provide a method and apparatus for virtual network management capable of being applied to a network in real time by efficiently learning network data using a graph neural network (GNN) in a network virtualization environment and creating a management model of an optimal virtual network function (VNF).

In other words, an object of the present disclosure is to provide a method and apparatus for virtual network management, which specifies what information should be used for machine learning for VNF management and suggests a way to use GNN as an algorithm suitable for learning network data, so that an optimal VNF management policy can be found and applied to a network in an efficient and fast time using GNN in a virtualized network environment, and thus network management costs can be reduced.

Another object of the present disclosure is to provide a method and apparatus for virtual network management capable of significantly reducing overall network operation cost based on an optimal VNF deployment policy of each node in a virtual network environment.

In other words, another object of the present disclosure is to provide a method and apparatus for virtual network management, which receives network traffic information and network resource information, find the optimal VNF management policy of each node in a short time based on machine learning, and repeatedly apply it to the network, thereby effectively handling network traffic while minimizing network operation cost.

According to a first exemplary embodiment of the present disclosure, a method for graph neural network-based virtual network management may comprise: preprocessing collected network data; converting node and edge data among the data for each category generated in the preprocessing step into a graph; learning the network data expressed in a matrix generated in the step of converting into the graph using a graph neural network (GNN); and learning node state information for each node generated through the learning using the GNN using a feedforward neural network (FNN) together with service list data.

In the step of learning using the FNN, when a number of data in a first class is smaller than a number of data in another second class, a first weight given to learn the first class may be set to be greater than a second weight given to learn the second class in order to prevent class imbalance of learning data.

The method for graph neural network-based virtual network management may further comprise, after the step of learning using the FNN, the step of generating a virtual network function (VNF) management decision including adding, removing, or leaving as is for all learned nodes.

The method for graph neural network-based virtual network management may further comprise, before the preprocessing step, the step of defining data used for machine learning.

In the defining step, network data composed of node and link and service data may be expressed and defined as VNF (virtual network function) sequence, the node may have information on a number of available central processing unit (CPU) cores and available bandwidth, the link may include information on delay and the available bandwidth, and the service data may include information on a node where a service starts, a node where a service arrives, a service type, service duration, cost due to service delay, maximum allowable delay, and demand bandwidth.

The method for graph neural network-based virtual network management may further comprise, before the preprocessing step and after the defining step, the step of generating a service information list indicating information of services required for the network at the time of list generation based on the definition of the data, wherein the service information list may be generated by adding the services defined using service start time and service execution time with a service list information ID and a most recently generated service.

The method for graph neural network-based virtual network management may further comprise, before the preprocessing step and after the generating step, the step of collecting physical network information and virtual network function (VNF) information when the service information list is generated.

The method for graph neural network-based virtual network management may further comprise, before the preprocessing step and after the collecting step, the step of preparing ground truth data to be used for machine learning based on the physical network information, the VNF information, and service information.

The step of preparing the ground truth data may include generating a ground truth data set including an installation cost of the VNF, an energy cost, a traffic delivery cost, a service delay cost, or a combination thereof, or using a prestored ground truth dataset.

In the preprocessing step, all numerical data of the network data may be normalized and expressed, and data for each category among the network data may be expressed by converting it into a number or a vector.

In the step of converting into the graph, a node matrix, an edge matrix and a connection matrix, which have node information, edge information, and connection information between the nodes and between the node and the edge, respectively, may be generated, the node matrix is a matrix of a number of nodes×a node feature, the edge matrix is a matrix of the number of nodes×an edge feature, the connection matrix is a matrix of the number of nodes×the number of nodes, and has a value of 1 when there is a link between the nodes, and has a value of 0 when there is no link between the nodes.

According to a second exemplary embodiment of the present disclosure, an apparatus for graph neural network-based virtual network management may comprise: a preprocessing unit to preprocess collected network data; a conversion unit to convert node and edge data among the data for each category generated in the preprocessing unit into a graph; a first learning unit to learn the network data expressed in a matrix generated in the conversion unit using a graph neural network (GNN); and a second learning unit to learn node state information for each node generated through the first learning unit using a feedforward neural network (FNN) together with service list data.

The second learning unit may include a weight adjustment unit to set a first weight given to learn a first class to be greater than a second weight given to learn another second class in order to prevent class imbalance of learning data when a number of data in the first class is smaller than a number of data in the second class.

A loss function used in the second learning unit may be able to be changed according to a purpose of a user, and a learning model of the second learning unit may be provided to learn specific information according to the loss function.

The second learning unit may include an output unit to generate a virtual network function (VNF) management decision including adding, removing, or leaving as is for all learned nodes output as a learning result in the second learning unit.

The preprocessing unit may normalize and express all numerical data of the network data, and may convert and express data for each category among the network data into a number or a vector.

The conversion unit may generate a node matrix, an edge matrix and a connection matrix, which have node information, edge information, and connection information between the nodes and between the node and the edge, respectively, the node matrix is a matrix of a number of nodes×a node feature, the edge matrix is a matrix of the number of nodes×an edge feature, the connection matrix is a matrix of the number of nodes×the number of nodes, and has a value of 1 when there is a link between the nodes, and has a value of 0 when there is no link between the nodes.

The apparatus for graph neural network-based virtual network management may further comprise: a data definition unit to define data used for machine learning; a data generation unit to generate a service information list indicating information of services required for the network at the time of list generation based on the definition of the data; and a data collection unit to collect physical network information and virtual network function (VNF) information when the service information list is generated, wherein the service information list is generated by adding the services defined using service start time and service execution time with a service list information ID and a most recently generated service.

The data definition unit may express and define network data composed of node and link and service data as VNF (virtual network function) sequence, the node has information on a number of available central processing unit (CPU) cores and available bandwidth, the link includes information on delay and the available bandwidth, and the service data includes information on a node where a service starts, a node where a service arrives, a service type, service duration, cost due to service delay, maximum allowable delay, and demand bandwidth.

The data generation unit may generate a ground truth data set including an installation cost of the VNF, an energy cost, a traffic delivery cost, a service delay cost, other network management cost or a combination thereof, or may use a prestored ground truth data set, as ground truth data to be used for machine learning based on the physical network information, the VNF information, and service information.

BRIEF DESCRIPTION OF DRAWINGS

FIGS. 6A to 6C are diagrams for explaining a label data generation process that can be employed in the apparatus for virtual network management of FIG. 3.

DETAILED DESCRIPTION OF THE EMBODIMENTS

Figure 1:
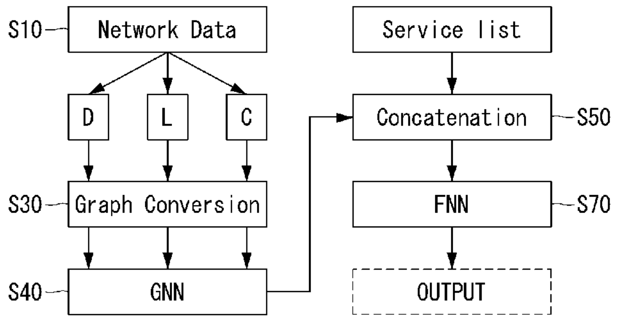
FIG. 1 is a schematic configuration diagram of a machine learning model for a method for virtual network management based on a graph neural network according to an embodiment of the present disclosure.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a schematic configuration diagram of a machine learning model for a method for virtual network management based on a graph neural network according to an embodiment of the present disclosure.

The machine learning model according to the present embodiment uses a feedforward network (FNN) and a graph neural network (GNN) for VNF management.

Here, FNN is a general machine learning model widely used and has a structure to propagate data forward. When input data is received, FNN multiplies or adds learning parameters to each input data. In this case, each input data may be added to each other to form one linear function expression, and may be converted into nonlinear data through an activation function. FNN continues to learn through hidden layers until it generates output data. Finally, the machine learning model performs learning by adjusting the values of the learning parameters so that the data output through the output layer matches the label data that is the learning target.

GNN uses graph data as input data and has a different learning structure from FNN. That is, when learning data, FNN expresses data in a line while ignoring the shape of the data and then performs learning, but GNN can directly use input data in graph form for learning.

Graph data applied to GNN consists of node feature and edge feature. The primary goal of GNN is to generate a node state using node feature and edge feature. The node state means a kind of information that each node has, and its state is continuously updated through learning. The node state is updated through state and feature of previous nodes, node feature and edge feature of neighboring nodes.

In this case, the transition function of the GNN plays a role of updating the node state, and each node continuously updates its own node state using features from neighboring nodes so that the entire graph feature can be understood. In addition, GNN generates output data that becomes a learning target by using an output function. The output function receives as an input the node state information obtained through iteration of the transition function, and can generate output data using a learning layer such as FNN.

In the method for virtual network management based on graph neutral network according to the present embodiment, network information is learned using a GNN-based machine learning model and an optimal virtual network function (VNF) deployment scenario or management policy is created.

As an example, a machine learning model may be configured to divide collected network data (S10) into predefined forms (D, L, C) as shown in FIG. 1 and convert them into a graph form (graph conversion, S30), learn the data converted into graph form using GNN (S40), and in parallel with this, obtain service list through learning using FNN for various service requests received from users by the network, and combine the two data learned through GNN and FNN above (concatenation, S50) to learn again with FNN (S70). The predefined types of network data include network data (D), link data (L), and connection data (C).

The method for virtual network management can make an optimal VNF management decision for each of all nodes by reflecting network information and traffic information through the above-described machine learning model and its operating principle. The VNF management policy of each node may include selecting and applying any one of adding, removing and leaving as it is for a specific VNF.

In addition, the method for virtual network management may employ a weight balance technique to prevent class imbalance of learning data when training the machine learning model. That is, if the number of data of a specific class in the input data input to the machine learning model is relatively small compared to the number of data of other classes, the machine learning model gives more weight to learning the corresponding class, and the operating environment can be adjusted so that the machine learning model learns appropriately.

According to this embodiment, virtual network management, that is, VNF management can be effectively performed. VNF management may aim to reduce network operating expenditure (OPEX) while ensuring service requirements. To this end, an optimal number of VNF instances may be deployed in an optimal location (server) while considering some requirements, such as service constraints and a physical network. That is, in the present embodiment, in terms of classification for all servers and VNF types, the VNF management policy (e.g., adding, removing, leaving as it is) may be applied in real time to the optimal number of VNF instances of each server.

Figure 2:
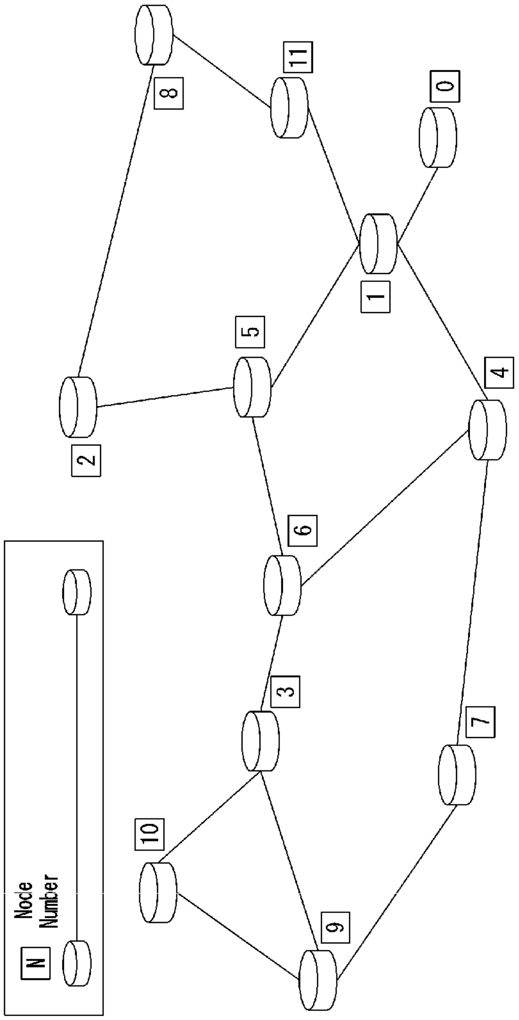
FIG. 2 is an exemplary diagram of a network topology to which the method for virtual network management method using the machine learning model of FIG. 1 can be applied.

FIG. 2 is an exemplary diagram of a network topology to which the method for virtual network management method using the machine learning model of FIG. 1 can be applied.

The method for virtual network management may be applied to each node in a network including a plurality of nodes. Here, the network is composed of nodes and links. For example, as shown in FIG. 2, a specific network may be configured to include 12 nodes divided by any one of node numbers 0 to 11, and 15 links connecting these nodes. A link may be referred to as an edge.

Specifically, the physical network may be expressed as an undirected graph (G) composed of nodes (N) and links (E). Nodes are classified into a server (s) that can deploy VNFs and a switch that cannot deploy VNFs. A server, which is a node capable of deploying VNFs, may be briefly referred to as a node (s) hereinafter.

If the number of available central processing unit (CPU) cores belonging to a predetermined resource is a predetermined number ($c_s$), the VNF installed in the VNF distributable node (s) is $V_s$, and the VNF data installed in the node (s) is $Dv_s$, the network data (D) of each node (s) may be expressed as node data $Ds=(c_s, Dv_s)$.

The physical link (E) is composed of link data (L) and connection data (C). When an arbitrary node pair (i, j) is an element of the physical link (E), the corresponding link data ($L_{ij}$) may be defined as ($m_{ij}$, $b_{ij}$, $d_{ij}$) in a known resource. Here, $m_{ij}$, $b_{ij}$, $d_{ij}$, which are elements of the link, represent a maximum allowable bandwidth, an available bandwidth, and a delay of the link between node i and node j in the order described, respectively. Also, the link may have link connection data ($C_{ij}$), which is an indicator indicating whether the link exists between two nodes, for example, node i and node j. Such link connection data (briefly, connection data) is represented by Equation 1 below.

$$C_{ij} = \begin{cases} 1 & \text{if } i = j \text{ or there is a link between node } i \text{ and } j, \\ 0 & \text{otherwise.} \end{cases} \quad \text{[Equation 1]}$$

As can be seen from Equation 1, if node i and node j are the same or if a link exists between node i and node j, the connection data ($C_{ij}$) is set to 1, and in otherwise, the connection data ($C_{ij}$) is set to 0.

To examine the virtual network function (VNF) in the above network, assuming that the VNF type group is $\mathcal{T}$ and each VNF has a different VNF type (t), the number of CPU cores required for the VNF, processing capacity, processing delay, and deployment cost are automatically determined according to the VNF type. Accordingly, if a predetermined type, for example, a t-type VNF belonging to the VNF installed in the node (s), is expressed as a first VNF ($V_{st}$), the first VNF may have dedicated data ($D_{st}$).

The dedicated data ($D_{st}$) of the first VNF is expressed by Equation 2 below.

$$D_{st} = \begin{cases} (I_{st}, \tau_t, \kappa_{st}) & \text{if } V_s \text{ has type } t, \\ 0 & \text{otherwise.} \end{cases} \quad \text{[Equation 2]}$$

In Equation 2, $I_{st}$ indicates the VNF instances number, $\tau_t$ indicates the maximum bandwidth of the t-type VNF, and $\kappa_{st}$ indicates the currently used bandwidth of the t-type VNF installed in the node (s), respectively.

As can be seen from Equations 1 and 2, the VNF data ($Dv_s$) installed in the node (s) may be expressed as VNF-dedicated data according to a specific type (t) belonging to the VNF type group.

According to the present embodiment, the method and apparatus for virtual network management may be configured to distribute the VNF management policy for the optimal number of VNF instances to the optimal server in real time in consideration of service constraints and physical networks.

Figure 3:
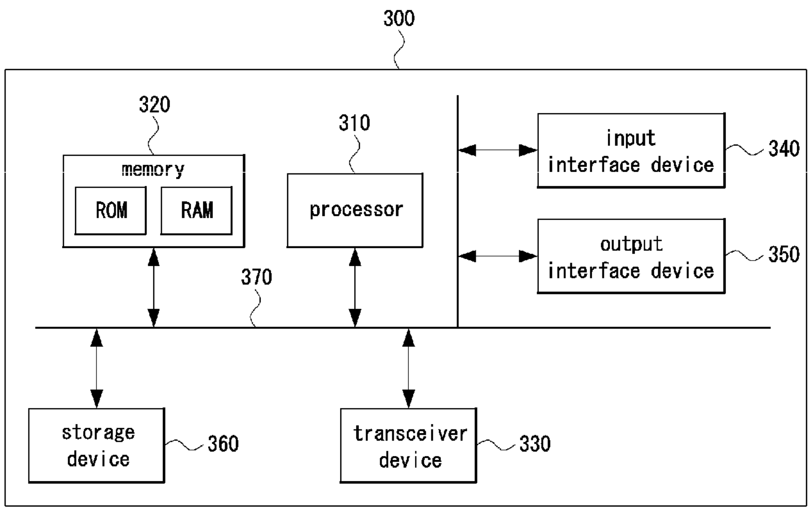
FIG. 3 is a schematic block diagram of an apparatus for virtual network management applicable to at least some nodes of the network topology of FIG. 2.

FIG. 3 is a schematic block diagram of an apparatus for virtual network management applicable to at least some nodes of the network topology of FIG. 2.

Referring to FIG. 3, the node 300 may include at least one processor 310, a memory 320, and a transceiver device 330 connected to a network to perform communication. Also, the node 300 may further include an input interface device 340, an output interface device 350, a storage device 360, and the like. Each of the elements included in the node 300 may be connected by a bus 370 to communicate with each other.

However, each of the elements included in the node 300 may not be connected to the common bus 370 but to a processor 310 through an individual interface or an individual bus. For example, the processor 310 may be connected to at least one of the memory 320, the transceiver device 330, the input interface device 340, the output interface device 350, and the storage device 360 through a dedicated interface.

The processor 310 may execute a program command stored in at least one of the memory 320 and the storage device 360. The program command may include program command necessary to implement data definition, data generation, data transformation, GNN processing, first FNN processing, concatenation, and second FNN processing illustrated in FIG. 1. When these program commands are executed by the processor 310 in a specific node 300, the corresponding node 300 may be configured to manage the virtual network using the graph neural network. The processor 310 may include a central processing unit (CPU), a graphics processing unit (GPU), or a dedicated processor on which methods according to embodiments of the present disclosure are performed.

Each of the memory 320 and the storage device 360 may be configured as at least one of a volatile storage medium and a non-volatile storage medium. For example, the memory 320 may be configured as at least one of a read only memory (ROM) and a random access memory (RAM).

The transceiver device 330 may be provided with a sub-communication system supporting 4G communication, for example, long term evolution (LTE), or LTE-A (advanced), 5G communication, for example, NR (new radio), etc. defined in the 3rd generation partnership project (3GPP) standard. 4G communication may be performed in a frequency band of 6 GHz or less, and 5G communication may be performed in a frequency band of 6 GHz or more as well as a frequency band of 6 GHz or less.

The communication protocols for 4G communication and 5G communication may include at least one or more of CDMA (code division multiple access), WCDMA (wideband CDMA), TDMA (time division multiple access), FDMA (frequency division multiple access), OFDM (orthogonal frequency division multiplexing), Filtered OFDM, CP (cyclic prefix)-OFDM, DFT-s-OFDM (discrete Fourier transform-spread-OFDM), OFDMA (orthogonal frequency division multiple access), SC (single carrier)-FDMA, NOMA (Non-orthogonal Multiple Access), GFDM (generalized frequency division multiplexing), FBMC (filter bank multi-carrier), UFMC (universal filtered multi-carrier), SDMA (Space Division Multiple Access) based communications protocols.

The input interface device 340 includes at least one selected from input means, such as a keyboard, a microphone, a touchpad, and a touch screen, and an input signal processing unit that maps or processes a signal input through at least one input means with a pre-stored command.

The output interface device 350 may include an output signal processing unit that maps or processes a signal output to a pre-stored signal type or level under the control of the processor 310, and at least one output means for outputting a signal or information in the form of vibration or light according to the signal of the output signal processing unit. The at least one output means may include at least one selected from output means such as a speaker, a display device, a printer, an optical output device, and a vibration output device.

The aforementioned node 300 may be referred to as a user equipment (UE), a terminal, an access terminal, a mobile terminal, a station, a subscriber station, a mobile station, a portable subscriber station, a device, an Internet of Thing (IoT) device, a mounted module, a mounted device, a mounted terminal, an on board device, or an on board terminal.

In addition, the above-described node 300 may include a user equipment or user terminal capable of communication and VNF distribution such as a personal computer (PC), a desktop computer, a laptop computer, a tablet PC, a wireless phone, a mobile phone, a smart phone, a smart watch, a smart glass, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player.

In addition, the node 300 according to the present embodiment may include a machine learning (ML) model (see FIG. 1) including a graph neural network (GNN) in the form of a program mounted on the memory 320, the storage device 360, or a separate computer-readable recording medium.

ML is a promising technology in many research fields, such as natural language processing and computer vision. Most of these fields use Euclidean domain data. Convolutional neural network (CNN) and feedforward neural network (FNN) are usually used to learn the data. On the other hand, ML has been used in chemistry, biology, or similar fields, CNN and FNN cannot learn the data because these data are typically non-Euclidean graph data. This non-Euclidean graph data contain rich relational information between each pair of neighboring elements and represent many types of graph structure data such as social networks and physical systems. In other words, when CNN and FNN learn non-Euclidean data, they ignore the graph structure of the data and lose much or the relational information between elements. Therefore, the machine learning model of the present embodiment uses the GNN model, which is a generalized model of CNN.

The GNN of this embodiment may take graph data as input, use graph connections, and share weights. In addition, the GNN can perform learning by graph embedding that learns how to express graph information including nodes and edges. The graph embedding is the transformation of property graphs to a vector or a set of vectors. The graph embedding may capture the graph information on nodes, edges, and subgraphs. By using graph embedding, the graph data can preserve information and be represented as compressed vector data for which vector operations, fast and simple operations, can be applied.

In other words, the GNN learns the relational information between nodes or network elements and represents graph data as vector data as graph embedding does. Here, CNN is a regularized version of a fully connected neural network (FCNN). FCNN connects each neuron in one layer to all neurons in the next layer, and it makes the overfitting problem. CNN uses hierarchical pattern in data, and it connects each neuron in one layer to some neurons in the local region of the next layer. This connection enables CNN to share weight parameters to reduce computational costs. The GNN takes this characteristics of CNN or FNN described above and shares weights by using the connection in the graph.

The objective of such GNN is to learn state embedding and obtain outputs (see S40 in FIG. 1). Let x and h denoted the input feature and hidden states, respectively, when co[v] is the set of edges connected to the service or service data (v), and ne[v] is the set of neighboring nodes of node v, the state embedding hv and output ov of node v can be defined as in Equation 3 below.

$$h_v = f(x_v, x_{co[v]}, h_{ne[v]}, x_{ne[v]}),$$

$$O_v = g(h_v, x_v). \quad \text{[Equation 3]}$$

In Equation 3, $x_v$, $x_{co[v]}$, $h_{ne[v]}$, $x_{ne[v]}$ are the features (data) of a service or service data (v), the feature of edges connected to v, the states of neighborhood nodes of v, and features of the neighborhood nodes of v, respectively, in the order described. Further, f is a transition function and g is an output function.

The Banach fixed point (H) can be represented as a global transition function (F), and the global transition function (F) can be defined by the stacking variables (H) of all states and a stacking variable (X) for graph features. The Banach fixed point may be defined as the only fixed point obtained by contraction mapping on a complete metric space where no points are missing within or at the boundary of a particular space. Similarly, outputs (O) can be represented as a global output function (G), where the global output function (G) can be defined by an accumulated variable (H) for all states and an accumulation variable ($X_D$) for node features. This is expressed as Equation 4 below.

$$H = F(H, X),$$

$$O = G(H, X_D). \quad \text{[Equation 4]}$$

The aforementioned global transition function (F) and global output function (G) can be a neural network such as FNN, CNN, and recurrent neural network (RNN). The machine learning model of the present embodiment may update the Banach fixed point until the learning process is completed.

Meanwhile, in the present embodiment, the GNN model may use a weighted sum method when creating new states for nodes using neighborhood information of nodes. In this case, the weighted sum method does not need to consider the order and size of nodes, but has the disadvantage of smoothing structural information. To overcome this disadvantage, an edge-conditioned filtered graph CNN generates edge filters. The filter generation function is FNN, and it generates a filter matrix that is multiplied by the feature sets of neighborhood nodes. By averaging the multiplied values, a new node label can be generated. Suppose that the above-described filter generation function is parameterized by the predetermined weight parameter, a state by an arbitrary l-th transition function may be defined as a sum with a bias parameter. After obtaining the state by the l-th transition function, the output can be obtained using the output transition function.

On the other hand, in the machine learning model of the present embodiment, GNN is used and network data is treated as a graph. The graph has connectivity information and can provide network structure data. Compared to the existing technology, the VNF management problem of this embodiment is far more difficult to solve, but instead of deriving the optimal number of VNF instances, a GNN-based virtual network function management solution is used to determine the number of instances and locations for all nodes and all VNF types.

In particular, to obtain generalizability of the VNF management using machine learning or artificial intelligence, GNN uses graph data explicitly so that the model can factor in network structures. Unlike the case where this model cannot be applied to difficult networks because the model has learned only single network topology, or the case where this model cannot be applied to difficult networks when the target network topology is changed because of network failures, the explicit use of graph data indicates that reliability of the output of GNN can be stably secured in the network domain.

Meanwhile, the apparatus for virtual network management may receive many different service requests from users or through user interfaces.

In this case, it is supposed that the service data has information on the node where the service starts, the node information on which the service arrives, information on types of the service, information on service duration, information on cost due to service delay, information on maximum allowable delay, and information on demand bandwidth. In this case, the service is variously represented according to the service requests from user terminals, and may be expressed as a set of VNF sequences.

A detailed definition of service data that can be employed in the method for virtual network management of the present embodiment can be expressed as Equation 5.

$$v = (w_v, u_v, d_v, \phi_v, p_v, \beta_v, \gamma_v) \quad \text{[Equation 5]}$$

The parameters in Equation 5 and their definitions are as follows.

v: service or service data $v \in \psi$, $\psi$: set of services $w_v$: node where sevice (v) starts $u_v$: node where service (v) arrive $d_v$: execution time of service (v)

$\phi_v$: type of service (v)

$p_v$: penalty cost due to delay of service (v)

$\beta_v$: demand bandwidth of service (v)

$\gamma_v$: delay condition of service (v)

There are several types of VNFs, such as a firewall, intrusion detection services (IDS), and a network address translation (NAT) function, wherein the number of CPU cores, installation cost and maximum allowable bandwidth are different for each type.

In addition, the each installed VNFs receives traffic, so the bandwidth currently used may be different from each other. VNF may be additionally defined in addition to the above-mentioned information. That is, after the definition of VNF, the services requested by the network and the information that services have, can be defined by VNF.

In this embodiment, network data may be collected in a real environment or a simulation environment, and the network information of various environments is collected as data. Then, whenever service information is generated in a test bed or collected in an actual environment, a service information list may be generated.

Figure 4:
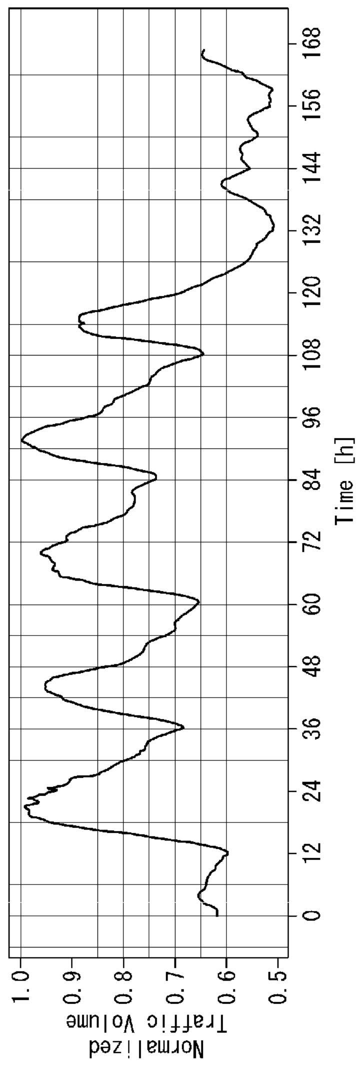
FIG. 4 is an exemplary diagram of a normalized traffic pattern of a network that can be employed in the apparatus for virtual network management of FIG. 3.

FIG. 4 is an exemplary diagram of a normalized traffic pattern of a network that can be employed in the apparatus for virtual network management of FIG. 3.

FIG. 4 shows a traffic pattern of Internet2 for a week generated in an actual network. By repeating these traffic patterns, a four-week traffic pattern can be generated. In the present embodiment, a service request and a request list according to the service request may be generated by using the traffic pattern. The request list corresponds to the service information list.

In the request list, the information list indicates information of services required for the network at the time of list generation, and can be expressed as in Equation 6 using the start times and execution times of the generated services.

$$\pi_{\mu+1}=\{v_{new}\}\cup\pi_{\mu}\cap\{x:d_{v_x}>\hat{\alpha}_{v_{new}}-\hat{\alpha}_{v_x}\} \quad \text{[Equation 6]}$$

In Equation 6, $\pi_{\mu+1}$ denotes a current service information list for a current service list information ID ($\mu$+1), $v_{new}$ denotes the most recently generated service, $\mu$ denotes a service list information ID or a service list information ID immediately preceding the current in time, $\pi_\mu$ denotes an immediately preceding service information list for an immediately preceding service list information ID, $\hat{\alpha}$ denotes service generation time, $d_{v_x}$ denotes service execution time of the service generated at a random time (x), $\hat{\alpha}_{v_{new}}$ denotes service generation time of the most recently generated service, $\hat{\alpha}_{v_x}$ denotes service generation time of the service generated at an arbitrary time, respectively.

The aforementioned request list may be generated whenever a new service request is generated. In addition, the request list may include several service requests for which the service time (d) has not yet expired. This request list is intended to assume an actual network situation in which several services are provided at the same time.

TABLE 1

| Service ID | Service type | Proportion |
|---|---|---|
| 1 | NAT - Firewall - IDS | 0.3 |
| 2 | NAT - Proxy | 0.4 |
| 3 | NAT - WANO | 0.3 |

As shown in Table 1, 5 requests per minute can be generated according to the proportion (P) of the service type for the service request identified by a service identifier (ID) (1, 2, 3). In addition, it is possible to estimate the traffic pattern by discarding 5 requests per minute, as indicated by the normalized traffic volume of FIG. 4.

In a real network environment, more services can be requested at a specific point in time, but for a simple implementation, it is assumed that the request list contains up to 4 requests. The request complexity is defined as $n(\pi)$, which is the number of requests included in the request list. The service time (d) is defined so that the proportion of request complexity is made like $\pi|(n(\pi)=1)$:0.14, $\pi|(n(\pi)=2)$:0.33, $\phi|(n(\pi)=3)$:0.36, and $\pi|(n(|)=4)$:0.17.

Two bandwidth ranges $\beta_v$ are set for data request (v). One bandwidth range is 33 to 38 Mbps and the other bandwidth range is 330 to 380 Mbps. These bandwidths are set for multiclass learning based on the capacity of the VNF. When the bandwidth range is between 33 and 38 Mbps, up to one VNF instance can be deployed. The dataset with a bandwidth between 33 and 38 Mbps is called as the base request dataset. When the bandwidth range is between 330 and 380 Mbps, up to four VNF instances can be deployed. The dataset with a bandwidth between 330 and 380 Mbps is called the auxiliary request dataset.

As a service delay condition of service level agreement (SLA) violation, the maximum latency range may be randomly set between 700 and 750 ms. The ingress server and egress server for service request are randomly selected and cannot be the same server. The penalty cost of the SLA violation may be set to 0.1. The service type consists of several VNFs, and existing VNF catalog data can be used. The specifications of the VNF types are shown in Table 2 below.

TABLE 21

| Network function | CPU required | Processing capacity | Processing delay |
|---|---|---|---|
| Firewall | 2 | 900 Mbps | 45 ms |
| Proxy | 2 | 900 Mbps | 40 ms |
| IDS | 4 | 600 Mbps | 1 ms |
| NAT | 1 | 900 Mbps | 10 ms |
| WANO | 2 | 400 Mbps | 5 ms |

In Table 2, IDS represents an intrusion detection system, NAT represents network address translation, and WANO represents a wide area network optimizer.

Figure 5:
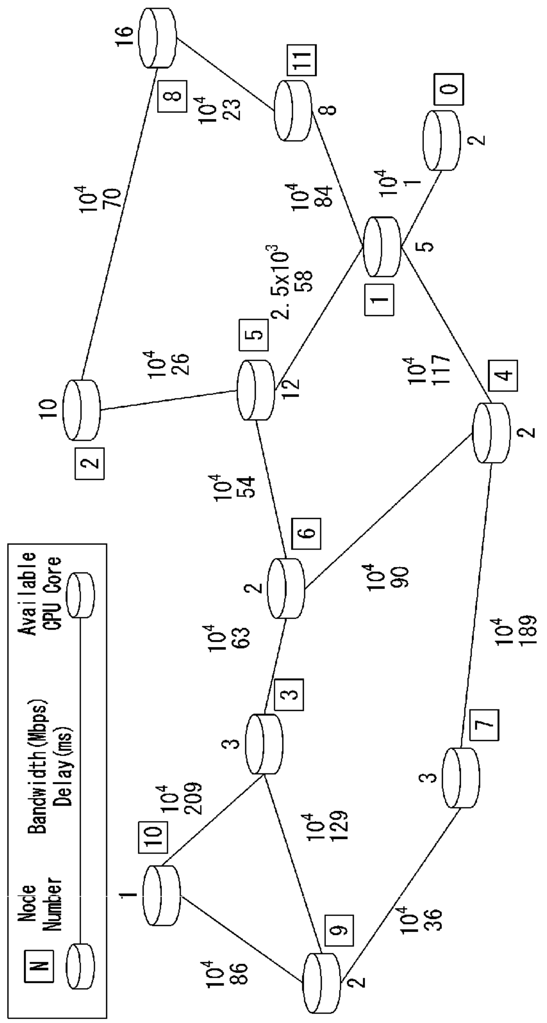
FIG. 5 is an exemplary diagram for explaining network data that can be employed in the apparatus for virtual network management of FIG. 3.

FIG. 5 is an exemplary diagram for explaining network data that can be employed in the apparatus for virtual network management of FIG. 3.

The Internet2 network in FIG. 5 is used and the AT&T IP network and the global environment for networking innovation (GENI) network is referred. The Internet2 network topology consists of 12 nodes each indicated by node numbers 0 to 11 in a square box and 15 edges connecting these nodes. Assume all nodes are servers. The number of available CPU cores are marked as predetermined natural numbers (e.g., 1, 2, 3, 5, 8, 10, 12, 16) around the cylindrical shape indicating each node, and information on maximum bandwidth and delay are marked around each edge, respectively. Table 3 shows the specifications of server, and cost of energy consumption and packet transition.

TABLE 3

| | Energy consumption | | Cost information | |
|---|---|---|---|---|
| CPU cores | Idle energy | Peak energy | Energy cost | Transition cost |
| 16 | 80.5 W | 2735 W | 0.1 | $3.62 \times 10^{-7}$ per bit |

As described above, the method for virtual network management according to the present embodiment may collect current network data every time a new request list is generated. The network data includes server data (D), link data (L), and connection data (C). Further, when all information of physical network, VNF and service are collected, the method for virtual network management can generate data to be used as ground truth data for machine learning using integer linear programming (ILP) or other methods. Then, by connecting the generated data with the request list and performing learning, the optimal VNF policy for the current network can be obtained. When the optimal VNF policy is found, the method changes the current network configuration to the optimal network configuration. This process may be repeated until all of the generated data are handled.

In the method for virtual network management of the present embodiment, specific ILP equations may be used to obtain an optimal VNF policy. The specific ILP equations may relates to several costs associated with network management, such as VNF deployment cost, energy cost, traffic forwarding cost, SLA violation cost and a resource fragmentation cost.

First, the ILP for the energy cost ($\mathbb{E}$) may be represented as Equation 7.

$$\mathbb{E} = \sum_{n\in N} \sum_{t\in T} I_{st}\left(e_{ie} + (e_{pk} - e_{ie})\frac{\varepsilon_t}{C_{spec}}\right)\lambda_{energy} \quad \text{[Equation 7]}$$

The definitions of the main parameters in Equation 7 are as follows.

$e_{ie}$: idle energy cost $e_{pk}$: peak energy cost $C_{spec}$: the number of CPU Cores $\lambda_{energy}$: energy consumption cost In addition, the ILP for the traffic forwarding cost ($\mathbb{T}$) may be represented as Equation 8.

[Equation 8]

$$W_{s_1 s_2}^{vt_1 t_2} = \begin{cases} 1 & \text{if } V_{s_1 t_1} \text{ has traffic between } V_{s_2 t_2} \text{ for } v, \\ 0 & \text{otherwise.} \end{cases}$$

$$J_{s_1 s_2}^{\mu t_1 t_2} = \sum_{v\in\pi_\mu} \sum_{t_1 t_2 \in T} W_{s_1 s_2}^{vt_1 t_2} \beta_v$$

$$\mathbb{T} = \sum_{s_1\in N} \sum_{s_2\in\vartheta(s_1), s_2<s_1} \left(J_{s_1 s_2}^{\mu t_1 t_2} - J_{s_1 s_2}^{(\mu-1)t_1 t_2}\right)\lambda_{transit}.$$

In Equation (8), $\vartheta(s_1)$ denotes a neighborhood node of a specific node (s1), and $\lambda_{transmit}$ denotes a packet forwarding cost, respectively. As can be seen from Equation 8, when for service v, there is traffic between the service $v_{s_1 t_1}$ of the first node (s1) distributing the first VNF type (t1) and the service $v_{s_2 t_s}$ of the second node (s1) distributing the second VNF type (t2), the traffic forwarding cost may be set to 1, otherwise it may be set to 0.

In addition, the ILP for the SPA violation cost or service delay cost ($\mathbb{S}$) may be represented as Equation 9.

[Equation 9]

$$\mathbb{S} = \sum_{v\in\pi_\mu} \max \left(\sum_{t\in\hat{\phi}_v} \delta_t + \sum_{s_1\in N} \sum_{s_2\in\vartheta(s_1), s_2<s_1} \sum_{t_1 t_2\in T} W_{s_1 s_2}^{vt_1 t_2} d_{s_1 s_2} - \gamma_v, 0\right) P_v$$

In Equation 9, $\hat{\phi}$ denotes VNFs included in the service delay ($\phi_v$).

The SPA violation cost or service delay cost corresponds to a set of costs of all services to be considered in the network based on the service obtained from the node such as the user terminal at the current point in time considered for calculating the corresponding cost. This service delay cost is one of the methods of calculating the existing network service delay cost, and other methods of calculating the network service delay cost may be used.

In addition, the ILP for the resource fragmentation cost ($\mathbb{F}$) may be represented as Equation 10.

[Equation 10]

$$\mathbb{F} = \sum_{s\in N, V_s\neq 0} \left(C_{spec} - \sum_{t\in T} I_{st}\varepsilon_{st}\right)\lambda_{core} + \sum_{s_1\in N} \sum_{s_2\in\vartheta(s_1)} \frac{\max\left(J_{s_1 s_2}^{\mu t_1 t_2}, 0\right)}{J_{s_1 s_2}^{\mu t_1 t_2}} \left(m_{s_1 s_2} - J_{s_1 s_2}^{\mu t_1 t_2}\right)\lambda_{band}$$

In Equation 10, $\lambda_{core}$ denotes an individual CPU core cost, and $\lambda_{band}$ denotes an individual bandwidth use cost.

The resource fragmentation cost may be calculated by adding the sum of the individual CPU core cost obtained from each node of the network and the sum of the individual bandwidth use cost at the current point in time considered to calculate the cost, but is not limited thereto, other conventional methods of calculating the resource fragmentation cost may be used.

The entire ILP objective equation including energy cost ($\mathbb{E}$), traffic forwarding cost ($\mathbb{T}$), service delay cost ($\mathbb{S}$) and resource fragmentation cost ($\mathbb{F}$) is represented as Equation 11 below.

$$\acute{a}\mathbb{E} + \acute{b}\mathbb{T} + \acute{c}\mathbb{S} + \acute{d}\mathbb{F} \quad \text{[Equation 11]}$$

In Equation 11, each of á, b́, ć, d́ denotes a weighting factor.

The method for virtual network management of the present embodiment may train the machine learning model to minimize the value of the ILP objective expression of Equation 11.

Meanwhile, ground truth data may be generated by applying other ILP formulas or heuristic algorithms other than the ILP represented as in Equations 7 to 10 above. If the ground truth dataset is already stored, the ground truth data may be used.

Figure 6A:
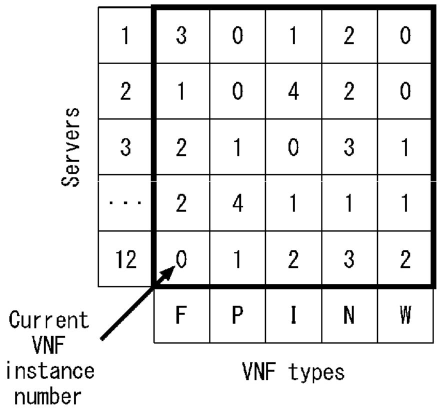
Figure 6B:
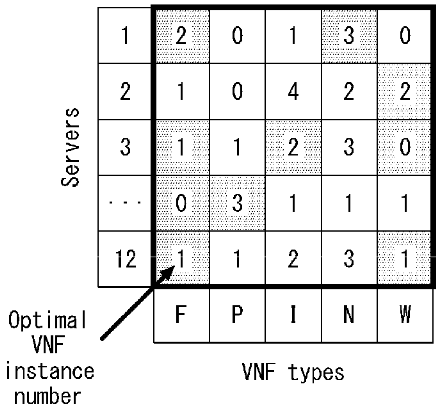

FIGS. 6A to 6C are diagrams for explaining a label data generation process that can be employed in the apparatus for virtual network management of FIG. 3.

FIG. 6A indicates each element value of a matrix representing servers and VNF types of a current network as a current VNF instance number. In VNF type, F stands for firewall, P stands for proxy, I stands for intrusion detection system (IDS), N stands for network address translation (NAT), and W stands for wide area network optimization (WANO), respectively.

FIG. 6B indicates a matrix of IPL solutions calculated based on various costs for overall network management including energy cost, traffic forwarding cost, service delay cost, and resource fragmentation cost. Each element value of the IPL solution matrix is represented as an optimal VNF instance number. The shaded portion in FIG. 6B is different from the corresponding portion in FIG. 6A and corresponds to a location (server) to which the optimal VNF management policy is to be applied.

FIG. 6C indicates a result of comparing the element value of current network of FIG. 6A and the corresponding element value of ILP solution of FIG. 6B. If the element value of the current network is greater than the corresponding element value of the ILP solution, 'removing' among the VNF management policy is applied; if the element value of the current network is greater than the corresponding element value of the ILP solution, 'leaving it as it is: None' is applied; and if the element value of the current network is smaller than the corresponding element value of the ILP solution, 'adding' is applied.

According to this embodiment, in generating a learning data set for machine learning (ML), whenever a new service request occurs, feature data can be generated from network data (D, L, C) and service request. At the same time, as described with reference to FIGS. 6A to 6C, label data can be generated by classifying the difference between the currently installed VNF and the ILP-based VNF installation solution.

The learning data may consist of both numeric data and categorical data. All numeric data can be normalized and one-hot-encoding can be applied for categorical data. In the present embodiment, the network data should be presented as a graph. Accordingly, it is possible to convert the node data (D) into a matrix whose size is a node number×a node feature number. Similarly, the connection data (C) and the link data (L) may also be converted into a matrix having a size of node number×node number.

Also, because each data set is used to classify 60 policies into the three classes of VNF management policy, as shown in FIGS. 6A to 6C, the last FNN layer may have 180 outputs. For each policy, a softmax can be applied and cross entropy can be used as a sub-loss function. The objective loss function can be expressed as the sum of multiplying the sub-loss function by the class weight.

The class weight may be the reciprocal of each class ratio of the data. The VNF policies are usually imbalance and this imbalance can degrade the performance of learning. Thus, it is possible to compensate for degrading of the learning performance by multiplying the sub-loss function with the class weights following the label class.

State information about each node including the label embedding generated through GNN learning is learned with service list data through FNN, and a weight balance technique can be used to balance the data class imbalance in the learning process.

Figure 7:
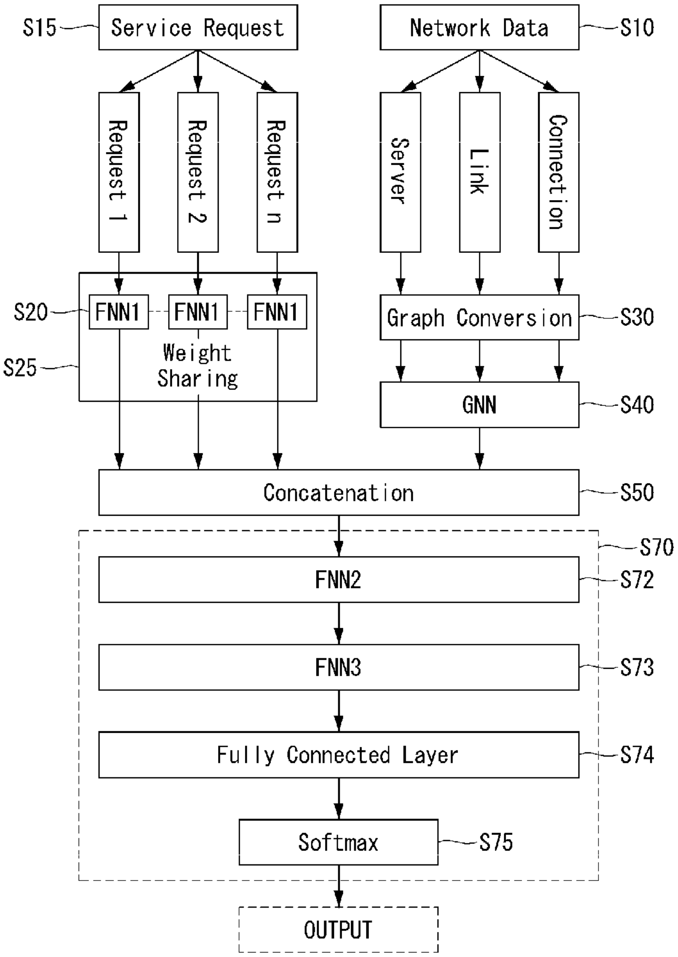
FIG. 7 is a schematic configuration diagram of a machine learning model for a method for graph neural network based virtual network management according to another embodiment of the present disclosure.
Figure 8:
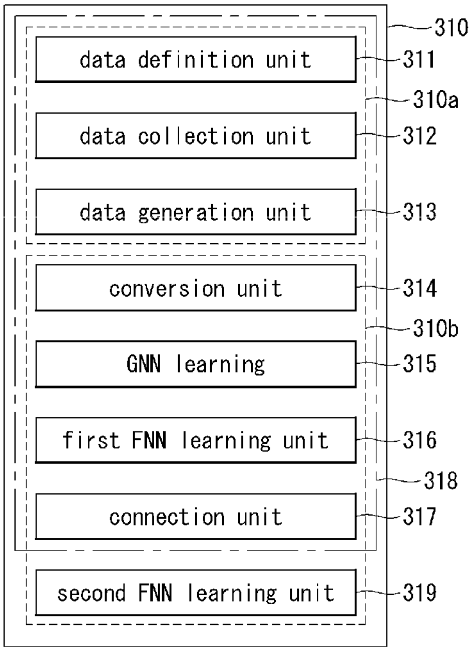
FIG. 8 is a schematic block diagram of software modules of an apparatus for virtual network management using the machine learning model of FIG. 7.
Figure 9:
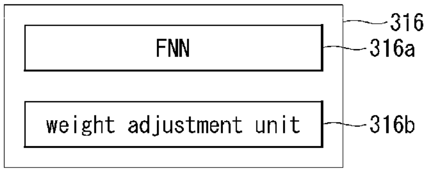
FIG. 9 is a block diagram illustrating a configuration that can be employed in the FNN learning unit among the software modules of FIG. 8.

FIG. 7 is a schematic configuration diagram of a machine learning model for a method for graph neural network based virtual network management according to another embodiment of the present disclosure. FIG. 8 is a schematic block diagram of software modules of an apparatus for virtual network management using the machine learning model of FIG. 7. FIG. 9 is a block diagram illustrating a configuration that can be employed in the FNN learning unit among the software modules of FIG. 8.

Referring to FIG. 7, the method for graph neural network based virtual network management according to the present embodiment is a method performed by a computing device having a processor and a memory. The method converts the network data (S10) including network information and traffic information into a graph form (graph conversion, S30), and then performs learning using GNN (S40), performs learning service request (S15) using FNN (S20), and then combines the two learned data (concatenation, S50) to learn again with FNN (S70). In this case, the network information and the traffic information are each expressed as information having a flattened form, and expressed as a single flattened form of information using a concatenate layer. The flatten information may refer to flattening 3D data as 2D or 1D data or flatly stretching 2D data to 1D data. The FNN (S70) may include a second FNN (FNN2, S72), a third FNN (FNN3, S73), a fully connected layer (FCL, S74), and a softmax (S75). The data represented in this way is learned using the FNN layer, and finally, a near-optimal VNF management decision can be made for all nodes by reflecting network information and traffic information. The VNF management decision may include adding of each node, removing of each node, or leaving each node as is.

In order to implement the above-described method for virtual network management, as shown in FIG. 8, the processor 310 of the apparatus for virtual network management may be provided with at least a data definition unit 311, a data collection unit 312, a data generation unit 313, a conversion unit 314, a GNN learning unit 315, a first FNN learning unit 316, a connection unit 317, and a second FNN learning unit 319, which are mounted in at least an operating state thereof.

Here, the data definition unit 311, the data collection unit 312, and the data generation unit 313 may be referred to as a data preprocessing unit 310*a* or a preprocessing unit, and the conversion unit 314, the GNN learning unit 315, the first FNN learning unit 316, the connecting unit 317, and the second FNN learning unit 319 may be referred to as an ensemble model learning unit 310*b*. In addition, depending on the implementation, the data definition unit 311, the data collection unit 312, the data generation unit 313, the conversion unit 314, the GNN learning unit 315, the first FNN learning unit 316 and the connection unit 317 may be referred to as an ensemble model generation unit 318. In addition, the GNN learning unit 315 may be referred as a first learning unit, the first FNN learning unit 316 may be referred as a preprocessing FNN learning unit, the connecting unit 317 may be referred as a combination data generation unit, the second FNN learning unit 319 may be referred as a main FNN learning unit or a second learning unit, and the output unit performing the FCL (S74) and the softmax (S75) of the second FNN learning unit 319 may be referred to as a VNF management policy output unit or a VNF management decision output unit, respectively.

The apparatus for virtual network management may define data to be used for machine learning through the data definition unit 311, generate, based on the definition of the data, a service information list indicating information of services required for the network at the time of list generation through the data generation unit 313, collect physical network information and virtual network function (VNF) information through the data collection unit 312 when the service information list is generated, and prepare ground truth data to be used for machine learning based on the physical network information, VNF information, and service information of the collected network data through the data generation unit 313. In this case, the apparatus for virtual network management 300 may receive a plurality of different service requests from the user.

It is assumed that the service data has information on the node where the service starts and the node where the service arrives, service duration, service delay cost, maximum allowable delay, and demand bandwidth information, along with the type of the service. In that case, the service is variously expressed according to a service request from the user terminal, and may be expressed as a series of VNF sequence.

The apparatus for virtual network management may be configured to collect and generate all data to be used for learning, and then undergo a preprocessing process. For example, all numerical data may be normalized and expressed through the ensemble model generation unit 318, and data for each category may be represented by one-hot-encoding.

In addition, the apparatus for virtual network management 300 converts the node and edge data into graph data through the conversion unit 314 (S30) in consideration of learning the network data using the GNN (S40), and each can be expressed as a node matrix, edge matrix, and connection matrix having node feature, edge feature and connection feature, respectively.

The node matrix may be the matrix of number of nodes× node features, and the edge matrix may be the matrix of number of nodes×number of nodes×edge features. Also, the connection matrix may be a matrix of number of nodes× number of nodes, and may have a value of 1 when there is a link between nodes, and 0 otherwise. Graph conversion of network data can be represented differently depending on the structure of the GNN used.

In addition, the apparatus for virtual network management 300 learns network data represented in a matrix through the GNN learning unit 315 and generates state information of each node, and learns the generated node state information with service list data to which a weight factor is applied through the second FNN learning unit 319. Before being input to the second FNN learning unit 319, node state information and service list data may be combined into one through a concatenation function of the concatenation unit 317 or ensemble model generation unit 318.

As such, the machine learning model of this embodiment is, as shown in FIGS. 7 to 9, may convert the server data or node data, link data and connection data predefined from network data (S10) into a graph format through the conversion unit 315 (Graph Conversion, S30), perform GNN learning using the GNN learning unit 316 (S40) to generate state information for each node (node state information), and input, in parallel, a plurality of service requests (S15) including a first request (Request 1), a second request (Request 2) and a third request (Request 3) to each FNN for each service request (FNN1, S20), and generate a service list through sharing (S25) of a plurality of FNN weights. Then, after connecting the previously generated node state information with the service list data through the connection unit 318, it is possible to learn the node state information and the service list together through the second FNN learning unit 319 and output the learning result. Such machine learning may be repeatedly performed until a preset target value is reached or a preset number of iterations is reached, and a weight balance technique may be used to balance data class imbalance in the learning process.

Meanwhile, in the above-described embodiment, when training the machine learning model, a weight balance technique may be applied to prevent class imbalance of learning data such as service list data. For example, if the number of data in a specific class is small, increasing the weight of the machine learning model in learning the corresponding class can make the machine learning model learn more appropriately.

This weighted balancing technique may be performed by a weight adjustment unit 31*bb* of the first FNN learning unit 316 as shown in FIG. 9. The first FNN learning unit 316 may be configured to include only the FNN 316*a* performing the function of FNN1 (S20) of FIG. 7, or it may be configured to further include the weight adjustment unit 316*b*.

According to this embodiment, the machine learning model may convert the predefined server data or node data, link data, and connection data from network data (S10) into a graph format through the conversion unit 315 (Graph Conversion, S30), perform GNN learning using the GNN learning unit 316 (S40) to generate state information for each node (node state information), and in parallel, input a plurality of service requests (S15) including a first Request (Request 1), a second request (Request 2), and a third request (Request 3) to each FNN (FNN1, S20) for each service request, and generate a service list through the sharing (S25) of the plurality of FNN weights. Then, after connecting the previously generated node state information with the service list data through the connection unit 317, it is possible to learn the node state information and the service list together through the second FNN learning unit 319 and output the learning output. Such machine learning may be repeatedly performed until a preset target value is reached or a preset number of iterations is reached, and a weight balance technique may be used to balance data class imbalance in the learning process.

Equation 12 below is a loss function used by the model and represents applying a weight balancing technique to a cross-entropy function.

$$\text{Loss function}: \sum_{n \in N} \sum_{t \in T} \sum_{i}^{3} I_i^{st} \log(o_i^{st}) \frac{A_1^{st} + A_2^{st} + A_3^{st}}{A_i^{st}} \quad \text{[Equation 12]}$$

In Equation 12, $I_i^{st}$ denotes ground truth data, $o_i^{st}$ denotes output data, and $A_i^{st}$ denotes the number of classes when a policy is i, a node is s, and a VNF type is t, respectively.

On the other hand, the loss function used in the model can be changed according to the purpose of the user. For example, when learning the VNF policy, the type of VNF may not be considered, and only the location of the server to be installed may be considered. In addition, by adding an additional expression to [Equation 12], the learning model can be trained to respond sensitively to specific information.

$$\sum_{s\in N}\left|\sum_{t\in T}\sum_{i} i(l_i^{st} - o_i^{st})\right| \quad \text{[Equation 13]}$$

Equation 13 can be used by adding to Equation 12. In such a case, the learning model can be trained to respond sensitively to the location of the server to be installed and the number of instances of the VNF to be installed while considering information on the type of VNF less.

$$\sum_{t\in T}\left|\sum_{s\in N}\sum_{i} i(l_i^{st} - o_i^{st})\right| \quad \text{[Equation 14]}$$

Equation 14 can be used by adding to Equation 12. In such a case, the learning model considers information about the location of the server to be installed less, and can be trained to respond sensitively to the type of VNF and the number of instances of the VNF to be installed.

$$\left|\sum_{s\in N}\sum_{t\in T}\sum_{i} i(l_i^{st} - o_i^{st})\right| \quad \text{[Equation 15]}$$

Equation 15 can be used by adding to Equation 12. In such a case, the learning model can be trained to respond sensitively only to the number of instances of the VNF to be installed while considering the location of the server to be installed and information on the type of VNF less.

In this way, the apparatus for virtual network management 300 of the present embodiment may provide the ground truth close to the optimum which VNF management policy should be made by all nodes according to all VNF types through the output unit of the machine learning model or the output unit of the FNN. That is, in this embodiment, network information can be learned using a GNN-based machine learning model and an optimal VNF deployment scenario can be generated.

Figure 10:
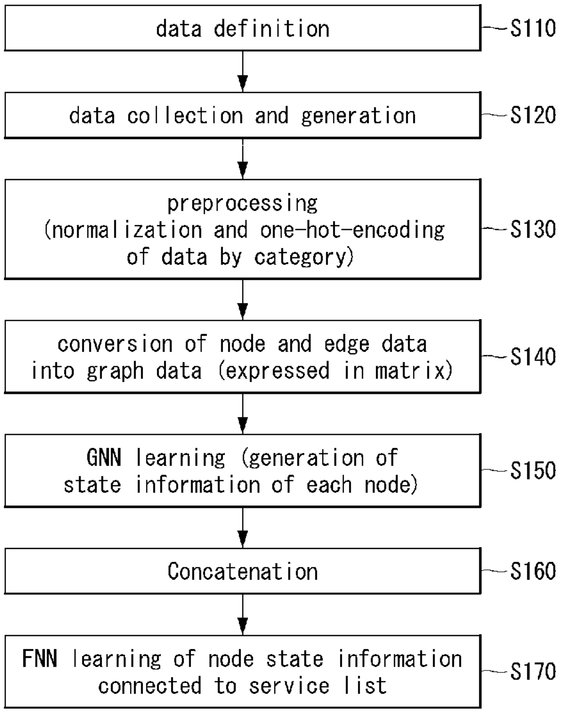
FIG. 10 is a flowchart illustrating an operating principle of a virtual network management method using the machine learning model of FIG. 7.

FIG. 10 is a flowchart illustrating an operating principle of a virtual network management method using the machine learning model of FIG. 7.

Referring to FIG. 10, in the method for virtual network management, the data used for machine learning may be first defined by a program mounted on the processor of the computing device (S110). In this step (S110), network data composed of nodes and links and service data may be represented and defined as a virtual network function (VNF) sequence.

In the definition of data, a node has information about the number of available central processing unit (CPU) cores and available bandwidth, a link has information about delay and available bandwidth, and service data includes a node where a service starts, a node where a service arrives, service type, service duration, service delay cost, maximum allowable delay time, and demand bandwidth.

Next, based on the definition of the data, a service information list indicating information of services required for the network is generated at the time of list generation, and physical network information and virtual network function (VNF) information are collected when the service information list is generated, and based on the physical network information, VNF information, and service information of the collected network data, it is possible to prepare ground truth data to be used for machine learning (S120).

Here, the service information list may be generated by adding the services defined using the service start time and service execution time with the service list information ID and the most recently generated service. Then, as the ground truth data set, a ground truth data set including the installation cost of the VNF, energy cost, traffic delivery cost, service delay cost, or a combination thereof can be generated or a prestored ground truth data set can be used.

Next, preprocessing may be performed on the collected network data (S130). In the preprocessing, all numerical data among network data is normalized and expressed, and category-specific data among network data can be expressed by converting them into numbers or vectors through a one-hot-encoding algorithm.

Next, node data and edge data of at least some of the preprocessed network data may be converted into graph data (S140). In this step (S140), a node matrix, an edge matrix, and a connection matrix having node information, edge information, and node-to-node connection information and node-to-edge connection information, respectively, may be generated. The node data or node information may include a node feature, the edge data or edge information may include an edge feature, and the graph data may include a node feature and an edge feature.

Here, the node matrix may be a matrix of the number of nodes X node features, and the edge matrix may be a matrix of the number of nodes X edge features. In addition, the connection matrix is a matrix of node number X node number, and may have a value of 1 when a link between nodes exists, and may have a value of 0 when a link between nodes does not exist.

Next, learning is performed using a graph neural network (GNN) on network data represented by the node matrix, the edge matrix, and the connection matrix (S150).

Meanwhile, a step of generating a service list through FNN learning for a service request is performed separately from the above steps (S110 to S150). In the process of generating service list data, a plurality of FNN weights may be shared.

Next, the node state information generated as a result of learning through the GNN neural network may be concatenated with service list data (S160).

Next, the data obtained by combining node state information and service list data is learned using a feedforward neural network (FNN) (S170). In learning using FNN, when the number of data in the first class is smaller than the number of data in the second class, the first weight given to learning the first class may be set to be greater than the second weight given to learning the second class, in order to prevent class imbalance of the learning data.

The method for virtual network management according to this embodiment may be configured to generate the virtual network function (VNF) management decision including adding, removing or leaving (do nothing) for all the learned nodes, after the step of learning using FNN (S170). The VNF management decision corresponds to optimal VNF management policy.

According to the present disclosure, network data is efficiently learned using a graph neural network (GNN) in a virtual network environment, and the optimal virtual network function (VNF) management policy is decided through relearning according to the service list and applied to the network. Accordingly, it can reduce network operating expenditure (OPEX) and capital expenditure (CAPEX).

In addition, according to the present disclosure, a network administrator can determine policies for all nodes suitable for each VNF type, for example, adding, removing, leaving as it is, etc. while considering user needs and the overall network state, and through this, the optimal VNF policy, which could not be found quickly in the existing integer linear programming (ILP) method, can be found in a short time based on machine learning.

In addition, according to the present disclosure, it is possible to solve the limitation of learning only a universal management policy because the network data cannot be properly utilized in the existing machine learning models. That is, in the present disclosure, network data is collected in a real environment or a simulation environment, and the collected data is learned through GNN and feedforward network (FNN), and the number of optimal instances for each VNF type for each node of the network is derived. Therefore, it is possible to solve complex VNF management problems.

In addition, according to the present disclosure, unlike the existing network management method that considers only a small number of factors such as the total number of VNFs required for the network, there is an advantage in that overall VNF management is possible by considering the type of VNF and the node to be installed.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for graph neural network-based virtual network management, performed by a computing system, the method comprising:

preprocessing collected network data of a virtual network to generate categorized node data, link data, and service data;

converting the categorized node data and link data into a graph structure, including a node matrix representing node features and an edge matrix representing link features;

generating, using a graph neural network (GNN), node embedding information for each node by learning structural and topological relationships expressed in the graph structure; and coupling the GNN with a feedforward neural network (FNN) by inputting the node embedding information into the FNN, and re-learning the node embedding information using the FNN to generate refined node state information; and generating, based on the refined node state information and service list data, input parameters for an integer linear programming (ILP) model configured to determine an optimal number and placement of virtual network function (VNF) management decision including deploying, removing, or maintaining VNF instances for respective nodes in the virtual network.

2. The method for graph neural network-based virtual network management according to claim 1, further comprising:

when a number of data in a first class of VNF management decisions is smaller than a number of data in a second class of VNF management decisions, setting a first weight for learning the first class to be greater than a second weight for learning the second class.

3. The method for graph neural network-based virtual network management according to claim 1, further comprising, before the preprocessing, defining data to be used for machine learning, wherein the collected network data corresponds to the data defined to be used for the machine learning.

4. The method for graph neural network-based virtual network management according to claim 3, wherein the defining comprises defining a VNF sequence representing connectivity structures among VNFs using network data composed of node data, link data, and service data, and wherein the node data has information on a number of available central processing unit (CPU) cores and available bandwidth, the link data includes information on delay and the available bandwidth, and the service data includes information on a node where a service starts, a node where a service arrives, a service type, service duration, cost due to service delay, maximum allowable delay, and demand bandwidth.

5. The method for graph neural network-based virtual network management according to claim 3, further comprising, before the preprocessing and after the defining, generating a service information list indicating information of services required for the virtual network at time of list generation based on a definition of the data to be used for the machine learning, wherein the service information list is generated by adding services defined using a service start time and a service execution duration.

6. The method for graph neural network-based virtual network management according to claim 5, further comprising collecting physical network information and VNF information when the service information list is generated.

7. The method for graph neural network-based virtual network management according to claim 6, further comprising, before the preprocessing and after the collecting, preparing ground truth data to be used for the machine learning based on the physical network information, the VNF information, and service information.

8. The method for graph neural network-based virtual network management according to claim 7, wherein preparing the ground truth data includes generating a ground truth data set including one or more of an installation cost of a VNF, an energy cost, a traffic delivery cost, and a service delay cost, or using a prestored ground truth data set.

9. The method for graph neural network-based virtual network management according to claim 1, wherein the preprocessing comprises normalizing and expressing numerical data of the collected network data, wherein the categorized node data, link data, and service data are each expressed by converting it into a number or a vector.

10. The method for graph neural network-based virtual network management according to claim 1, wherein:

converting into the graph structure comprises generating the node matrix, the edge matrix, and a connection matrix, which have node information, edge information, and connection information, respectively, the node matrix is a matrix of a number of nodes x a node feature, the edge matrix is a matrix of the number of nodes x an edge feature, and the connection matrix is a matrix of the number of nodes x the number of nodes, and has a value of 1 when there is a link between the nodes, and has a value of 0 when there is no link between the nodes.

11. A computing system, comprising:

one or more processors; and memory storing instructions that, when executed by the one or more processors, cause the computing system to:

generate node embedding information using a graph neural network (GNN) based on graph-structured network data;

re-learn the node embedding information using a feed-forward neural network (FNN) coupled to the GNN to generate refined node state information;

generate input parameters for an integer linear programming (ILP) model based on the refined node state information and service list data; and determine a virtual network function (VNF) management decision by solving the ILP model to obtain an optimal number and placement of VNF instances satisfying network resource constraints.

12. The computing system according to claim 11, wherein the instructions further cause the computing system to concatenate the node embedding information with the service list data to generate concatenated data, and wherein the FNN re-learns the concatenated data to generate the refined node state information.

13. The computing system according to claim 11, wherein the instructions further cause the computing system to adjust learning weights such that, when a number of data in a first class of VNF management decisions is smaller than a number of data in a second class of VNF management decisions, a weight applied to learning the first class is set to be greater than a weight applied to learning the second class.

14. The computing system according to claim 11, wherein the instructions further cause the computing system to:

select a loss function based on a user-defined optimization objective, and train the FNN using the selected loss function.

15. The computing system according to claim 11, wherein the instructions further cause the computing system to generate the VNF management decision including adding, removing, or maintaining respective VNF instances for learned nodes.

16. The computing system according to claim 11, wherein the instructions further cause the computing system to preprocess collected network data from a virtual network to generate categorized node data, link data, and service data, wherein the categorized node data, link data, and service data are each is expressed by converting it into a number or a vector.

17. The computing system according to claim 16, wherein the instructions further cause the computing system to convert node and edge data among the categorized node data, link data, and service into graph-structured network data that includes a node matrix, wherein:

the converting comprises generating the node matrix, an edge matrix, and a connection matrix, which have node information, edge information, and connection information, respectively, the node matrix is a matrix of a number of nodes×a node feature, the edge matrix is a matrix of the number of nodes×an edge feature, and the connection matrix is a matrix of the number of nodes×the number of nodes, and has a value of 1 when there is a link between the nodes, and has a value of 0 when there is no link between the nodes.

18. The computing system according to claim 11, wherein the instructions further cause the computing system to:

define data to be used for machine learning;

generate a service information list indicating information of services required for a virtual network at a time of list generation based on the defined data; and collect physical network information and VNF information when the service information list is generated, wherein the service information list is generated by adding services defined using a service start time and a service execution duration.

19. The computing system according to claim 18, wherein the instructions further cause the computing system to:

express and define a VNF sequence representing connectivity structures among VNFs using network data composed of node data, and link data, and service data, the node data has information on a number of available central processing unit (CPU) cores and available bandwidth, the link data includes information on delay and the available bandwidth, and the service data includes information on a node where a service starts, a node where a service arrives, a service type, service duration, cost due to service delay, maximum allowable delay, and demand bandwidth.

20. The computing system according to claim 18, wherein the instructions further cause the computing system to generate a ground truth data set including one or more of an installation cost of a VNF, an energy cost, a traffic delivery cost, and a service delay cost, or uses a prestored ground truth data set, as ground truth data to be used for the machine learning based on the physical network information, the VNF information, and service information.

* * * * *